(12) United States Patent
Alfke

(10) Patent No.: US 7,268,594 B1
(45) Date of Patent: Sep. 11, 2007

(54) DIRECT DIGITAL SYNTHESIS WITH LOW JITTER

(75) Inventor: Peter H. Alfke, Los Altos Hills, CA (US)

(73) Assignee: Xilinx, Inc., San Jose, CA (US)

( * ) Notice: Subject to any disclaimer, the term of this patent is extended or adjusted under 35 U.S.C. 154(b) by 112 days.

(21) Appl. No.: 11/128,774

(22) Filed: May 13, 2005

(51) Int. Cl.
*H03B 21/00* (2006.01)
(52) U.S. Cl. .................. 327/105; 327/107; 327/159
(58) Field of Classification Search ............... None
See application file for complete search history.

(56) References Cited

U.S. PATENT DOCUMENTS

| | | | | |
|---|---|---|---|---|
| 4,992,743 | A | * | 2/1991 | Sheffer .................. 327/106 |
| 5,371,765 | A | * | 12/1994 | Guilford ................. 375/373 |
| 5,673,212 | A | * | 9/1997 | Hansen .................. 708/271 |
| 6,693,468 | B2 | * | 2/2004 | Humphreys et al. ........ 327/105 |

* cited by examiner

*Primary Examiner*—Timothy P. Callahan
*Assistant Examiner*—An T. Luu
(74) *Attorney, Agent, or Firm*—Thomas A. Ward; Michael R. Hardaway

(57) ABSTRACT

An FPGA having a programmable frequency output is provided that achieves a (theoretical) M-times reduction in output jitter from a conventional direct digital synthesis (DDS) circuit, by running M accumulator circuits in parallel and combining the outputs in a time-staggered way. I Initially the frequency number N added into the accumulators is varied slightly for each accumulator by multiplying by a number, such as X/16 where X varies from 1 to 16 for each of 16 accumulator circuits. The accumulator circuits are further reconfigured so that the output of a register from a first accumulator provides feedback to the adder input in all of the accumulator circuits. The number of overflowing accumulator registers in a clock cycle will then indicate granularity spatially. To translate spatial granularity to time, a programmable delay circuit is connected to the output of each accumulator register.

13 Claims, 3 Drawing Sheets

DIRECT DIGITAL SYNTHESIS WITH LOW JITTER

BACKGROUND

1. Technical Field

The present invention relates to a clock signal source that provides a precise programmable output frequency. More particularly, the present invention relates to the use of Direct Digital Synthesis (DDS) or "phase accumulation" to provide a clock source with a fine resolution and low jitter.

2. Related Art

If it is necessary to generate a programmable output frequency with fine resolution and low jitter, for example as a clock source for a digital circuit, there is a natural conflict between programmability and stability, i.e. between frequency granularity and jitter. DDS or "phase accumulation" is the well-known traditional method to perform this function.

For DDS, an accumulator is clocked by the IC system clock, and overflow of the accumulator provides a digital pulse. The frequency of the pulse is related to the input to the accumulator. To program the frequency of overflow from the accumulator, a user selects the number added in the accumulator each clock cycle.

DDS can generate an average frequency with high resolution, limited only by the length of the accumulator. When operating near the limits of the IC system clock, jitter will be up to (plus or minus) one half clock period of the accumulator clock frequency. This means that jitter is >1 ns, with an accumulator operating at a maximum IC system clock frequency of approximately 500 MHz. For many clocking applications, this jitter is unacceptable.

Traditional jitter reduction methods include use of a phase locked loop (PLL) and well as digital signal manipulation. A phase locked loop is an analog device. A digital alternative is provided on the Spartan 3 and Virtex 4 series of Field Programmable Gate Arrays (FPGAs) manufactured by Xilinx, Inc. of San Jose, Calif., which uses a digital clock manager in frequency lock mode. But this mode can introduce frequency wander, where the period itself has little jitter, but the concatenation of many slightly-too-long or slightly-too-short periods can generate large timing errors, which is unacceptable in communication applications.

It is, therefore, desirable to provide a jitter reduction method for an IC so that a programmable frequency output can be provided near the limits of the IC system clock with minimal jitter.

SUMMARY

In accordance with embodiments of the present invention, a circuit generating a programmable frequency output is provided that achieves a (theoretical) M-times reduction in output jitter, by running M accumulators in parallel and combining the outputs in a time-staggered way. This avoids frequency wander with the parallel accumulators each forming a traditional DDS circuit with time staggering creating an overall circuit operating at a virtual speed many times higher than the IC system clock rate.

Instead of one accumulator that generates a synchronous overflow signal, there are now M−1 additional accumulators or registers that, on every clock, each add a smaller fraction of a frequency selection number N to the original accumulator content. At the moment when the original accumulator overflows, a certain number of the additional accumulators might also overflow, and that number indicates the timing error of the synchronous overflow signal that can be corrected by additional circuitry.

In one embodiment, sixteen (M=16) parallel accumulator circuits are used and a digital frequency selection number N is provided to one input of an adder in each accumulator that is multiplied by a number X/16, with X varying between 1 and 16. The parallel accumulator circuitry is modified so that the feedback from a register of the first accumulator (with input M=16/16) is provided as the feedback to the adder for the first accumulator as well as to the adder of all the other parallel accumulator circuits. The number of accumulator registers overflowing in a clock cycle will then indicate the adjustment needed in the frequency output for fine granularity. In one embodiment, only one of the register outputs overflowing is selected by AND gates that are configured to differentiate between adjacent accumulator registers so that only the register output indicative of the granularity adjustment needed is selected.

The outputs of the accumulator registers provide an indication of spatial granularity needed, but to translate the spatial granularity into time, in one embodiment, programmable delay devices are connected to the output of each register. The programmable delay devices are programmed with a delay indicative of the time delay needed from a clock edge to correspond with the spatial granularity for each accumulator circuit. The outputs of the delay devices are then combined using an OR gate. The OR gate output provides a single output with a stable frequency with fine granularity.

In one embodiment, the delay device used is provided at part of each input buffer in a FPGA. One FPGA providing a programmable delay device at each input is the Virtex-4 FPGA manufactured by Xilinx, Inc. of San Jose, Calif. In the Virtex-4 FPGA, internal multipliers provide for scaling, such as by X/16. Further, Digital Signal Processor (DSP) slices allow accumulator operation up to at least the system clock speed. Additionally, adder connections for the accumulator circuits can be provided by internal loop back connections within the FPGA, rather than requiring a connection externally such as feedback through a device pin. Programmable delay devices provided in the IOBs of the Virtex-4 allow fine timing granularity to be achieved.

The parallel accumulator circuits and associated delay device outputs will thus have an output transitioning more precisely than with a single accumulator, depending on the number of parallel accumulator circuits used. In one embodiment, with 16 accumulator circuits and connected delay devices used and clocked at 320 MHz in a FPGA, the theoretical output jitter limit occurs at a pulse width of 3.125 ns/(2×16)=97 ps. This is much less than the previous 3.125 ns/2=1552 ps for one accumulator.

In a further embodiment of the present invention, remaining jitter can be additionally reduced by means of a traditional PLL for more demanding applications. The PLL can be an external device used in demanding frequency generation applications, such as reference clocking for the Multi-Gigabit Transceivers found in the Virtex-4 FPGAs.

BRIEF DESCRIPTION OF THE DRAWINGS

Further details of the present invention are explained with the help of the attached drawings in which.

DETAILED DESCRIPTION

The accumulator circuitry, delay circuits and necessary logic for implementing embodiments of the present invention can be provided in a single FPGA. Although an FPGA is described as including such components, it is understood that either one or more other types of ICs can similarly include the components. Although other ICs can be used, for convenience, subsequent discussion of embodiments of the present invention will refer to components provided in an FPGA.

Figure 1:
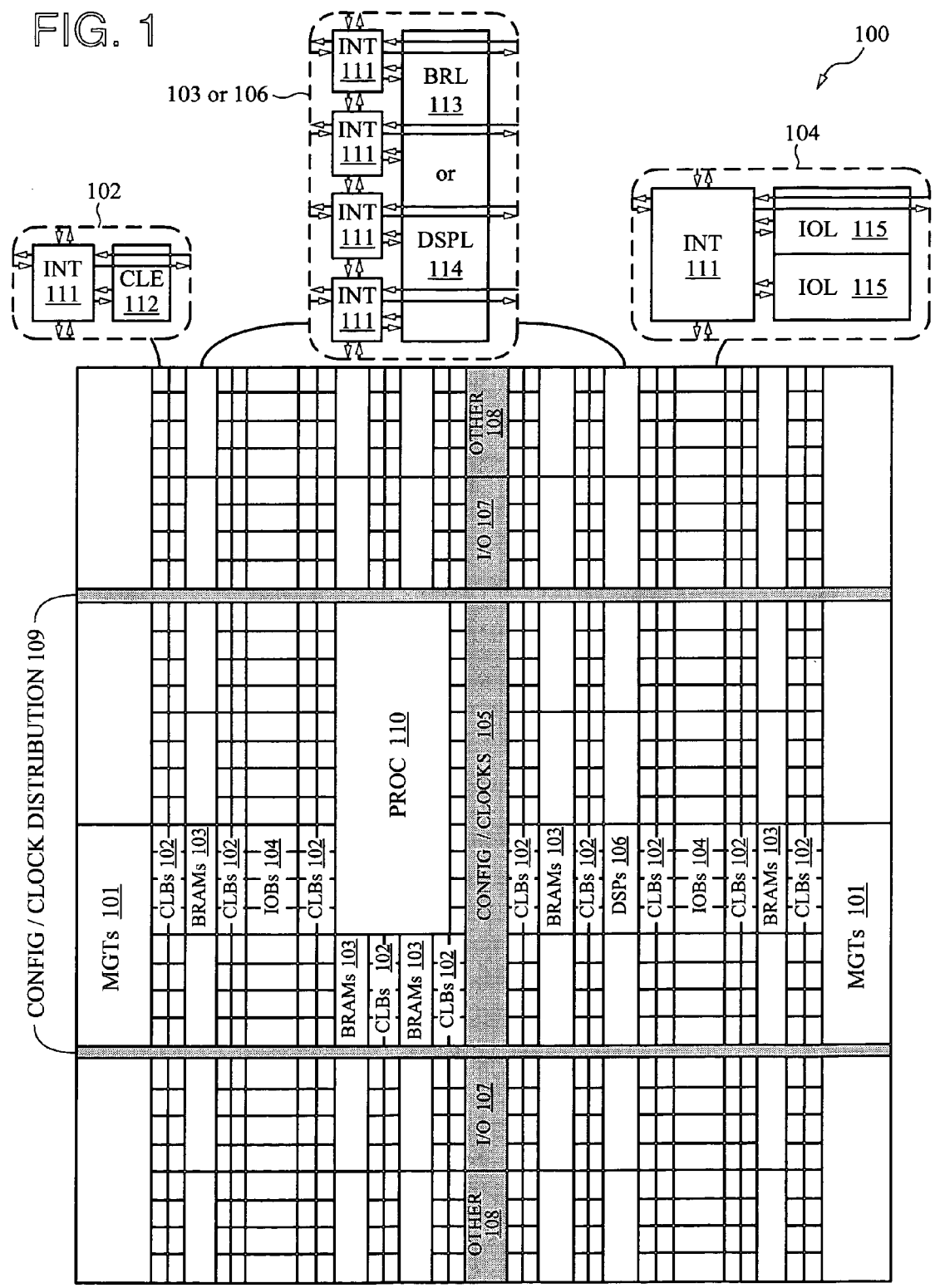
FIG. 1 illustrates one configuration of components in an FPGA.

For reference, FIG. 1 illustrates one configuration of components that can be included in an FPGA. The components include a large number of different programmable tiles including multi-gigabit transceivers (MGTs 101), configurable logic blocks (CLBs 102), random access memory blocks (BRAMs 103), input/output blocks (IOBs 104), configuration and clocking logic (CONFIG/CLOCKS 105), digital signal processing blocks (DSPs 106), specialized input/output blocks (I/O 107) (e.g., configuration ports and clock ports), and other programmable logic 108 such as digital clock managers, analog-to-digital converters, system monitoring logic, and so forth. The FPGA can also include a dedicated processor blocks (PROC 110).

Each programmable tile includes a programmable interconnect element (INT 111) having standardized connections to and from a corresponding interconnect element in each adjacent tile. Therefore, the programmable interconnect elements taken together implement the programmable interconnect structure for the illustrated FPGA. The programmable interconnect element (INT 111) also includes the connections to and from the programmable logic element within the same tile, as shown by the examples included at the top of FIG. 1.

For example, a CLB 102 can include a configurable logic element (CLE 112) that can be programmed to implement user logic plus a single programmable interconnect element (INT 111). A BRAM 103 can include a BRAM logic element (BRL 113) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 106 can include a DSP logic element (DSPL 114) in addition to an appropriate number of programmable interconnect elements. An IOB 104 can include, for example, two instances of an input/output logic element (IOL 115) in addition to one instance of the programmable interconnect element (INT 111). As will be clear to those of skill in the art, the actual I/O pads connected, for example, to the I/O logic element 115 are manufactured using metal layered above the various illustrated logic blocks, and typically are not confined to the area of the input/output logic element 115.

In the pictured embodiment, a columnar area near the center of the die (shown shaded in FIG. 1) is used for configuration, clock, and other control logic. Horizontal areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, the processor block PROC 110 shown in FIG. 1 spans several columns of CLBs and BRAMs.

Note that FIG. 1 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 1 are purely exemplary. For example, in an actual FPGA more than one adjacent column of CLBs is typically included wherever the CLBs appear, to facilitate the efficient implementation of user logic.

Figure 2:
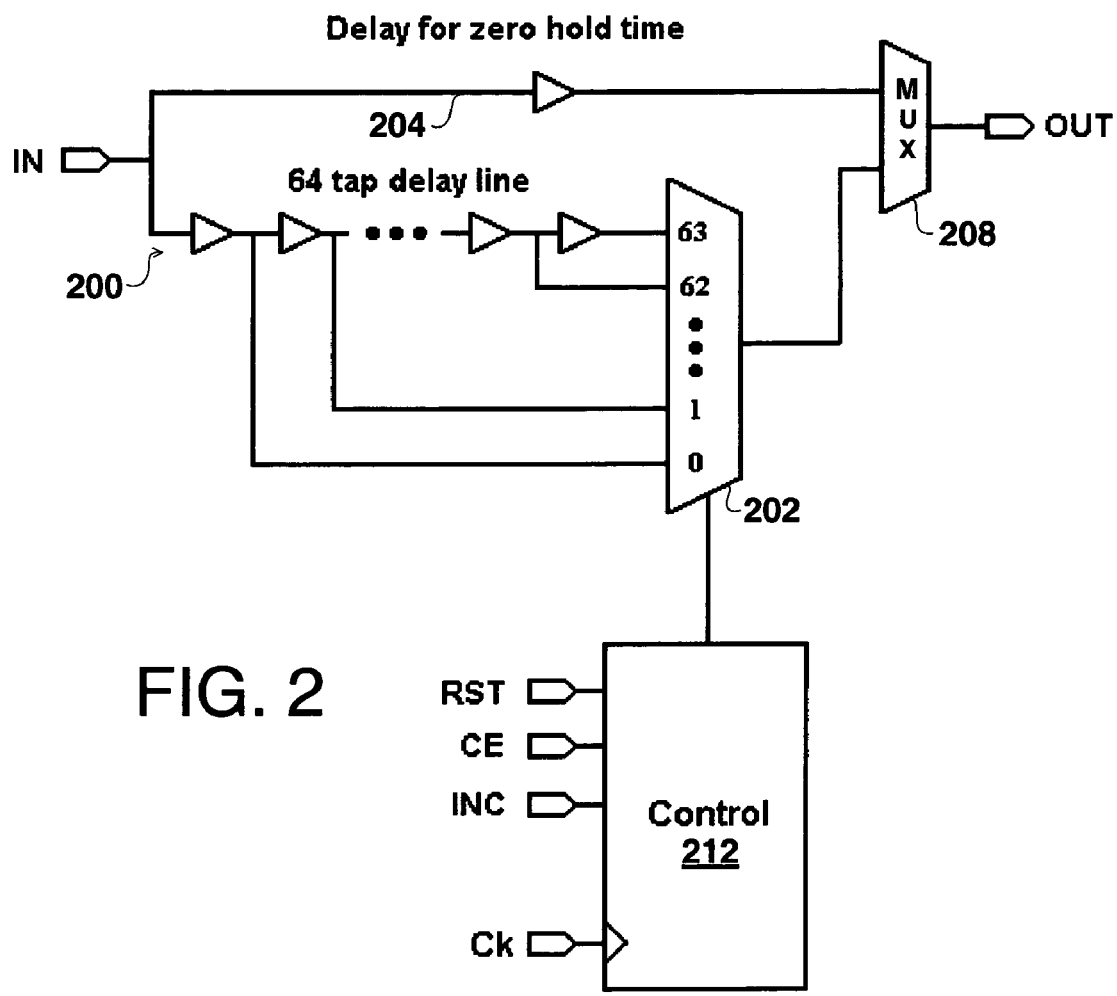
FIG. 2 shows a block diagram of components of a programmable delay circuit.

FIG. 2 shows a block diagram of components of a programmable delay circuit that can be used with embodiments of the present invention. Similar circuitry to that shown in FIG. 2 is included in the IOBs of the Virtex-4 family of FPGAs manufactured by Xilinx, Inc., of San Jose, Calif. Although the delay circuit of FIG. 2 is described herein, it is understood that alternative delay circuit configurations known in the art can be used to provide a variable delay in an IC for embodiments of the present invention.

The delay circuit of FIG. 2 includes a 64 tap delay line made up of inverters 200 having taps connecting the outputs of the inverters 200 to 64 inputs of a multiplexer 202. The series inverters 200 provide one path from the data input IN, while a second path 204 is provided through a single buffer when a programmable delay is not desired. The second path 204, and the output of multiplexer 202 are provided as inputs of another multiplexer 208. The output of the multiplexer 208 then provides the overall output OUT for the delay circuit of FIG. 2.

A control circuit 212 provides a select input to the multiplexer 202 to select a desired delay. In one embodiment, the delay provided by each inverter 200 is set to approximately 80 ps. The control inputs CE and INC, allow a user to increment and decrement the amount of absolute delay inserted into the data path in the discrete steps of 80 ps. The control inputs RST and Ck, provide the reset and clock inputs to the control circuit 212.

Figure 3:
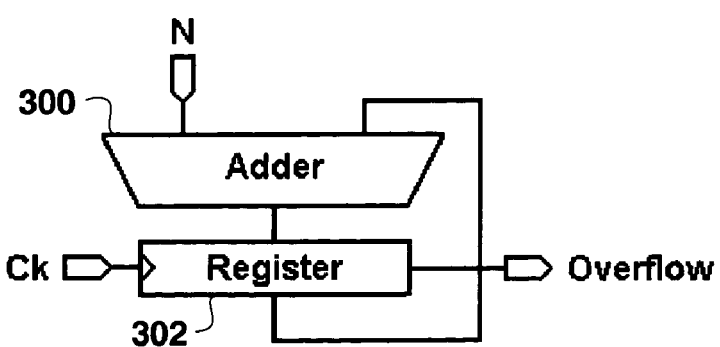
FIG. 3 shows a block diagram of components for an accumulator.

FIG. 3 shows a block diagram of components for an accumulator that can be used with embodiments of the present invention. The accumulator components are typical elements found in the DSP tiles of an FPGA, as well as in other types of ICs. The accumulator includes an adder 300 with an output provided to a register 302. The output of the register 302 is fed back to one input of the adder, while a second input of the adder 300 receives a binary input signal N. The register 302 is clocked by a clock signal Ck. The most significant bit of the accumulator register is used to indicate overflow. The accumulator functions by adding the user supplied binary number N to the previous contents of the register 300 each clock cycle. The number of clock cycles required before overflow occurs depends on the number N elected. A DDS frequency generator is formed using an accumulator with a programmable input N creating a desired frequency at the overflow output.

Figure 4:
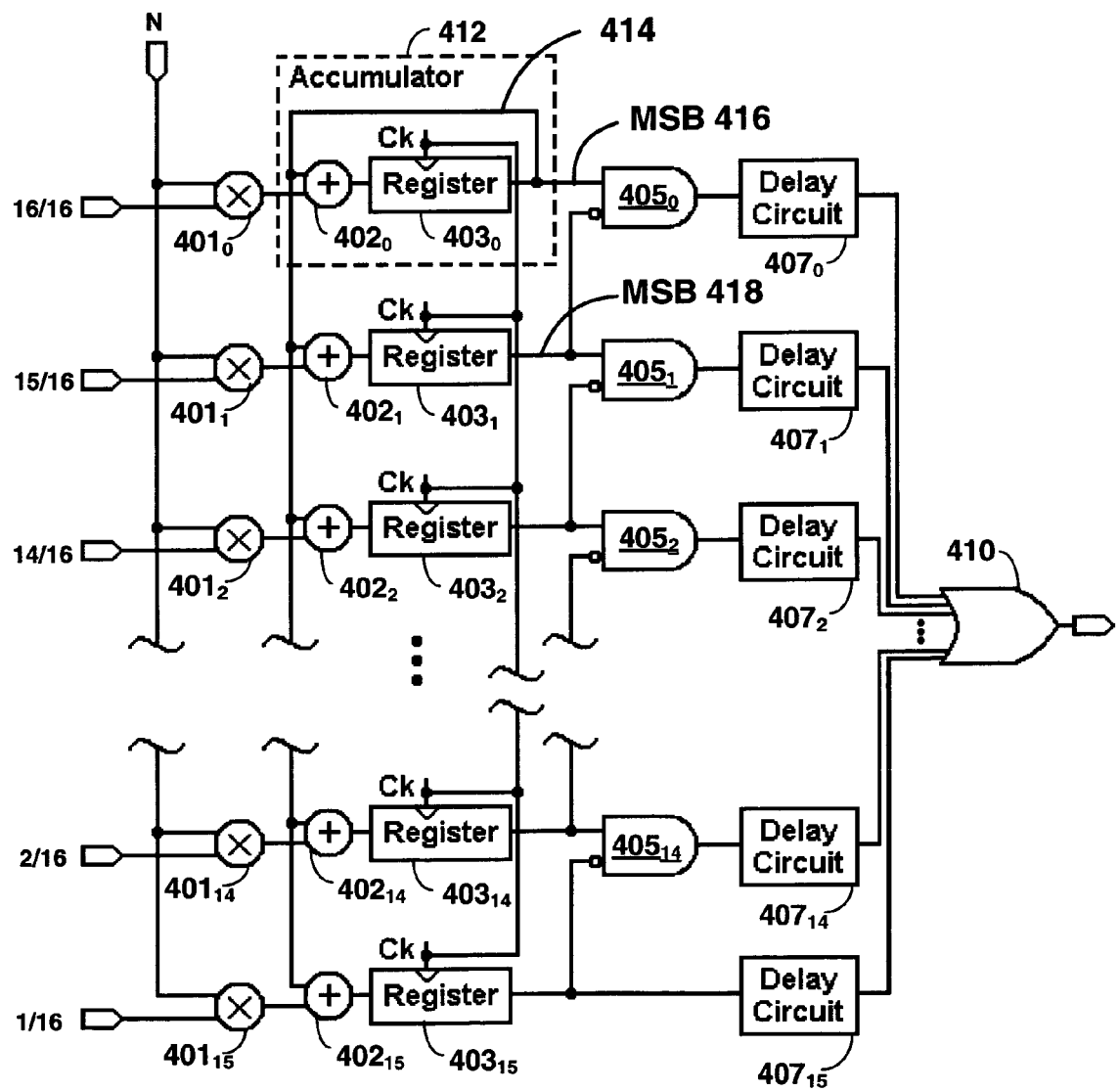
FIG. 4 shows a block diagram of components of a frequency generator according to embodiments of the present invention.

FIG. 4 shows a block diagram of components of a frequency generator according to embodiments of the present invention. The circuit of FIG. 4 includes 16 parallel accumulator circuits, each accumulator circuit including an adder $402_0$–$402_{15}$ and register $403_0$–$403_{15}$ as in FIG. 3, but with the feedback path 414 from the output of the first register $403_0$ providing feedback to its own adder $402_0$ (forming accumulator 412) as well as to the remaining adders $402_1$–$402_{15}$. The digital input N provides a frequency selection input directed to multipliers $401_0$–$401_{15}$. A second input to the multipliers $401_0$–$401_{15}$ is a digital input X/16, where X ranges from 1 to 16. The output of the multipliers $401_0$–$401_{15}$ then provides a second input to the respective adders $402_0$–$402_{15}$. A common clock input Ck is provided to clock the registers $403_0$–$403_{15}$.

To provide for turn on of only one of the accumulator circuit outputs at a time, the MSBs (i.e., the overflow bit of FIG. 3), e.g., MSBs 416 and 418, of the outputs of the registers $403_0$–$403_{15}$ are provided to AND gates $405_0$–$405_{14}$ that are connected to form differentiators. The AND gates $405_0$–$405_{14}$ have one input provided from a MSB output of a first one of the registers $403_0$–$403_{15}$, and a second inverted input provided from a MSB output of an adjacent one of the registers $403_0$–$403_{14}$. The output of the AND gates $405_0$–$405_{14}$ provide a spatially separated frequency signal with only one output being high at a time. In an another embodiment, only register $403_0$ in accumulator 412 needs all its bits, the other registers $403_1$ to $403_{15}$ need store only one bit, i.e., the overflow bit.

To convert space to time, delay circuits $407_0$–$407_{15}$, shown in block diagram, are connected to the output of each of AND gates $405_0$–$405_{14}$. The delay circuits $407_0$–$407_{15}$ are each programmed to a different time delay value, as described in operation of the circuit to follow, to account for the spatial separation of the output of each AND gate $405_0$–$405_{14}$. The outputs of the AND gates $405_0$–$405_{14}$ are then provided to a wide OR gate 410. The output of the wide OR gate 410 provides the desired output frequency with high resolution.

Features of the circuitry shown in FIG. 4 take advantage of components used in an FPGA, such as the Virtex-4 FPGA. Internal multipliers provide for scaling by n/16. Fast Digital Signal Processor (DSP) slices allow accumulator operation up to at least a system clock level. The adder connections for the accumulators can be provided by internal loop back connections within the FPGA, rather than requiring a connection externally such as feedback through a device pin. Programmable delay devices provided in the IOBs allow fine timing granularity to be achieved.

In operation, it is initially assumed that the circuit is set to generate an output frequency in the range of 40 to 80 MHz, using a DDS accumulator clocked at 320 MHz. The binary word N provided to the multipliers $401_0$–$401_{15}$ to define an output frequency is 27 bits long. The 27 bit output from the multipliers to adders $402_0$–$402_{15}$ of the parallel accumulator circuits with an additional three most significant bits (MSBs) of "100" being added (the two 0s being the most significant bits) to create a 30 bit binary word provided to each accumulator adder.

If N=0, then the MSB of the accumulator register output over 16 clock transitions will sequence: 0000111100001111. The frequency of transition of the MSB in the accumulator register will be one eighth of the clock rate (40 MHz in this case). If N is all 1 s, i.e. its max value, the MSB over 16 transitions will sequence 0011001100110011. The frequency of transition of the MSB in the accumulator register will be very close to a quarter of the clock rate (80 MHz in this case).

With the clock frequency of 320 MHz, the clock period will be 3.125 ns. The accumulator registers will, thus, provide synchronous outputs with a 3.125 ns clock period, but the overflow or carry output frequency from each register will be any number of programmed values depending on the value of N selected with a granularity of less than 1 Hz. Granularity is created by the amount of overflow. As an example, in base 10 if the accumulator register overflowed at 100 and the number N provided to the accumulator adder is 7, the overflow will occur on the 15th clock cycle, or with the register output changing from 98 to 105. The overflow, thus, does not occur to exactly match the clock edge, so jitter is created relating to the amount of overflow, in this example it is 5. Returning to the binary example, with a 3.125 ns clock period, the maximum overall output jitter will be one half clock period, or 1.5625 ns. That is far too much for many applications.

To compensate for the jitter, the accumulator circuits are augmented with the 15 multiplier circuits $401_0$–$401_{15}$ to multiply a different fractional value of X (X/16, 2X/16, 3X/16, 4X/16 . . . 15X/16). The output of each multiplier will, then, cause a slightly different remainder upon overflow of each successive accumulator register. The rise of the outputs of the accumulator registers on a clock edge then provides an indication of the jitter. If the original number N created a very small remainder after the clock edge, no other outputs will rise on the same clock edge other than the one multiplied by 16/16. If the remainder is slightly larger, then the accumulator circuit receiving N multiplied by 15/16 will also have a rising edge. If the remainder is somewhat larger, then the accumulator circuit receiving N multiplied by 14/16 will have a rising edge on the same clock cycle, etc. There are thus 16 different ways the 16 outputs can rise, and this provides a 16 times finer indication of the timing granularity, although all 16 signals are still synchronous to the same 320 MHz clock.

The number of accumulator registers transitioning at the rising edge of a clock cycle will, thus, indicate the granularity. In one embodiment, the particular one of the accumulator register outputs indicating the transition is determined using the AND gates $405_0$–$405_{14}$. The AND gates $405_0$–$405_{14}$ digitally differentiate adjacent output pairs and make only the last output that would transition active on any clock edge. Although the AND gates $405_0$–$405_{14}$ are used to select one of the register outputs, a different arrangement of logic or other circuitry to differentiate adjacent outputs might likewise be used. The one output selected, in any case, provides an indication of fine timing granularity in space, but not in time.

To correct the time so that the desired output transitions at the desired point after a clock cycle occurs, the outputs are staggered by the delay circuits $407_0$–$407_{15}$. The delays are programmed to provide an appropriate time delay corresponding to the timing granularity in space indicated by the particular accumulator output. Since only one of the AND gate outputs will be active, only one delay line will receive a signal and provide an output with the appropriate delay. By ORing the results of the delay lines, the output of the OR gate 410 will provide the desired programmable frequency signal with fine granularity.

In the embodiment described 16 accumulator circuits are used and clocked at 320 MHz, and provided to 16 different delay circuits. The theoretical output jitter is 3.125 ns/2× 16=97 ps, rather than the 3.125 ns/2=1552 ps provided with one accumulator. Although shown with 16 accumulator circuits and corresponding delay circuits, it is understood that different numbers of these parallel circuits can be used depending on desired granularity. Further, rather than multiplying the frequency selection number N by X/16, as an alternative the 16 accumulator circuits can be operated with staggered clocks. Finally, the 30 bit value for N and the MSBs that remain fixed can be varied based on design requirements. In another embodiment N is a predetermined number for determining the output frequency and is a positive integer and rather than 16 accumulator circuits, there are M accumulator circuits, where M is a positive integer. Thus the frequency number N is multiplied X/M, where X now varies from 1 to M.

In a further embodiment of the present invention, remaining jitter can be additionally reduced by means of a traditional PLL. In one embodiment the PLL can be an external device used in demanding frequency generation applications, such as reference clocking for the Multi-Gigabit Transceivers found in the Virtex-4 FPGAs.

To assure accurate results are maintained, since the programmable delay devices are active devices that have delays varying with time, regular calibration of the programmable delay devices is preferable. With active elements, calibration maintains measurement monotonicity. In one embodiment, calibration can be performed simply by driving a series of asynchronous edges into the delay circuits with known delay times in-between, and adjusting the programmable delay circuits to maintain monotonicity over many captured edges. With an FPGA including programmable delay circuits as shown in FIG. 2, a calibration delay line can be included internal to the FPGA that is used to continually monitor and reset the delays of the inverters so that a constant delay is maintained at each tap point.

Although the present invention has been described above with particularity, this was merely to teach one of ordinary skill in the art how to make and use the invention. Many additional modifications will fall within the scope of the invention, as that scope is defined by the following claims.

What is claimed is:

1. An integrated circuit (IC) having components for providing a programmable frequency output, the IC comprising:
 a plurality of accumulator circuits, each accumulator circuit comprising an adder and a register in series wherein each adder having a first input connected to an output from a first one of the registers,
 wherein a second input of each adder receives a numerical input, a first one of the numerical inputs being related to a second one of the numerical inputs by a predetermined number;
 a plurality of delay circuits for providing various delays, the delay circuits each having a first terminal connectable to the output of one of the registers; and
 one or more multipliers, each multiplier having a first input receiving the predetermined number for determining the output frequency, an output connected to the second adder input in one of the accumulators, and having a second input receiving a fractionally different number than other ones of the multipliers.

2. The IC of claim 1, wherein the numerical inputs to the second inputs of the adders have a particular number of the most significant bits that are the same.

3. The IC of claim 1, further comprising:
 an AND gate having a first input receiving the output of a given one of the registers, and a second input receiving an inverse of an output from one of the registers adjacent to the given register, and having an output provided to one of the delay circuits.

4. The IC of claim 3, further comprising:
 an OR gate having inputs connected to the outputs of the delay circuits and having an output providing the programmable frequency output and where the predetermined number is a positive integer N and each of the second inputs to the multipliers being different by at least 1/M, where M is an integer.

5. The IC of claim 1, wherein the delay circuits each have a programmable delay.

6. The IC of claim 1, wherein the IC comprises an FPGA.

7. The IC of claim 6, wherein the FPGA comprises:
 input/output buffer (10B) circuits, the delay devices each being provided in one of the input/output buffer IOBs.

8. The IC of claim 7, wherein the FPGA comprises:
 a delay line providing a standard, the delay line being connectable to each of the delay circuits to enable calibration of the delay provided.

9. An integrated circuit (IC) having components for providing a programmable frequency output, the IC comprising:
 a plurality of means for adding, each of the means for adding having an add input receiving a numerical input indicative of the programmable frequency desired that is varied relative to other ones of the means for adding, and each means for adding providing an overflow output;
 a plurality of means for delaying a signal, the means for delaying each providing a different variable delay, and each having a first terminal connectable to the overflow output of one of the means for adding; and
 means for multiplying data, each having a first input receiving a predetermined number to select the output frequency, an output connected to the add input of one of the means for adding, and a second input receiving a predetermined fraction.

10. The IC of claim 9, further comprising:
 logic gates, each having a first input receiving the output of a given one of the accumulators, and a second input receiving at least one output from one of the accumulators adjacent to the given accumulator, and an output provided to one of the means for delaying.

11. The IC of claim 10, further comprising:
 a means for combining having inputs connected to the outputs of the means for delaying and having an output providing the programmable frequency output.

12. A method of providing a programmable frequency source, comprising:
 adding inputs to parallel registers during successive clock cycles, wherein a first input added to each of the parallel registers comprises the output of a first register of the parallel registers and each second input added to each of the parallel registers includes N times a multiple of 1/M, where N is a predetermined number for determining the output frequency and M comprises a total number of parallel registers;
 delaying overflow outputs from the parallel registers with various delay values; and
 selecting only one of the parallel register outputs to enable during a given one of the clock cycles depending on a number of the parallel registers that overflow during the given clock cycle.

13. The method of claim 12, further comprising:
 selecting one of the delayed outputs to provide the programmable frequency output depending on a number of the parallel accumulators that overflow during a clock cycle.

* * * * *